(No Model.)
F. J. MITCHELL.
APPARATUS FOR MEASURING LIQUIDS.
No. 548,718. Patented Oct. 29, 1895.
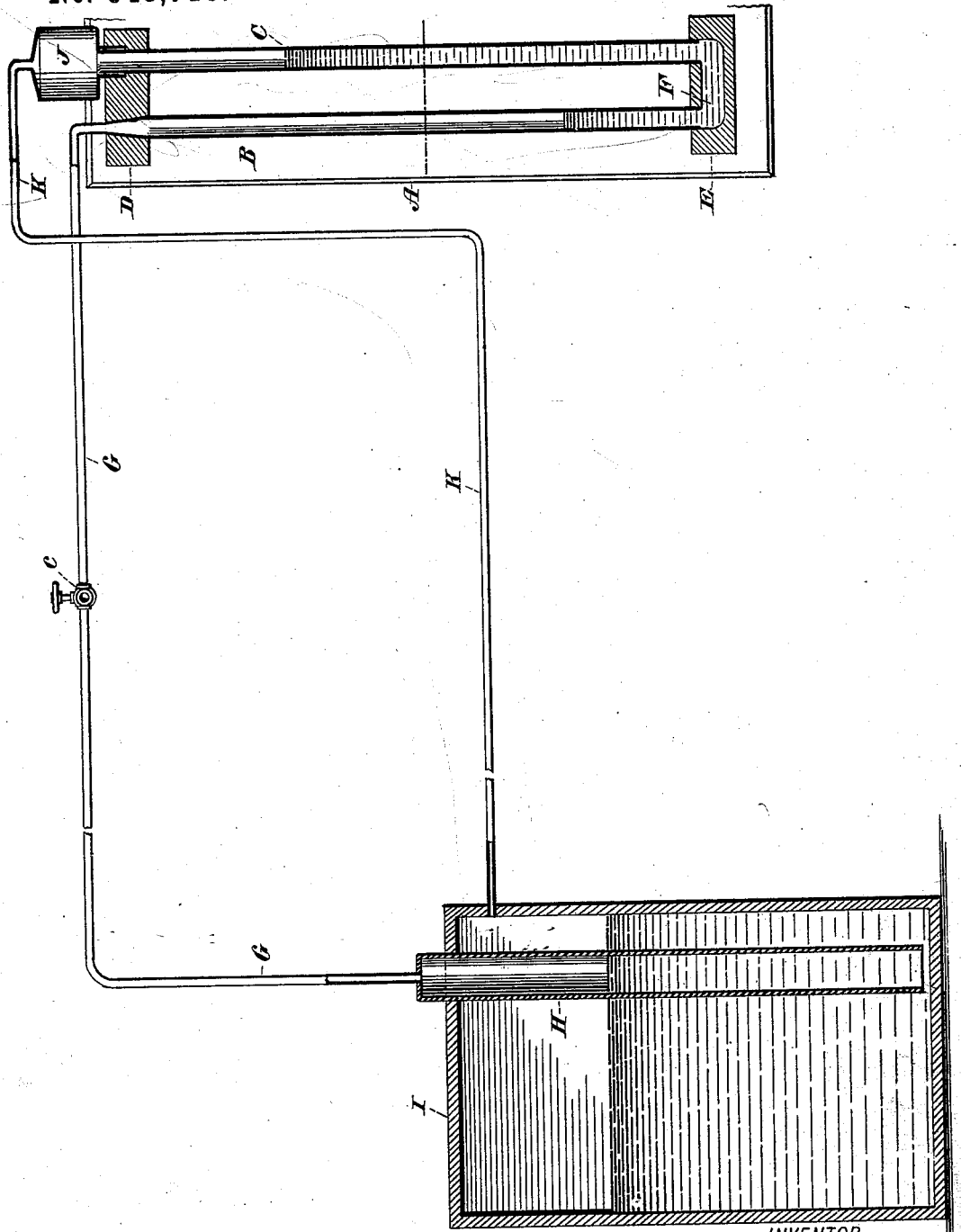
WITNESSES:
Gustave Dieterich
Henry Baer
INVENTOR
Frederick J. Mitchell
BY Augustus Dieterich
his ATTORNEY.

UNITED STATES PATENT OFFICE.

FREDERICK J. MITCHELL, OF NEW YORK, N. Y.

APPARATUS FOR MEASURING LIQUIDS.

SPECIFICATION forming part of Letters Patent No. 548,718, dated October 29, 1895.

Application filed October 10, 1893. Serial No. 487,749. (No model.)

*To all whom it may concern:*

Be it known that I, FREDERICK J. MITCHELL, a citizen of the United States, residing at the city of New York, in the county and State of New York, have invented certain new and useful improvements in apparatus for measuring the quantity of water or liquid in steam-boilers, tanks, or other containers, whether the same be under pressure or not, in close proximity to or at a distance from or above or below the gage, of which the following is a specification.

My invention relates to novel improvements in apparatus for measuring the quantity of water or liquid in steam-boilers, tanks, or other containers; and it consists in the combination, connection, and arrangement of parts hereinafter more fully set forth.

The object of my invention is to provide a simple means whereby the quantity of liquid in a container of any description may be accurately determined without having recourse to the container itself. When used on board of ship to determine the quantity of water in the boiler, the chief engineer will be enabled by the use of my apparatus, when the gage is placed in any desired part of the ship, to correctly ascertain the height of the water in the boiler without being obliged to descend into the boiler-room in the hold, and there examine the water-glass affixed to the boiler. It may likewise be used to determine the amount of water in wells or tanks at a distance from the house, or to measure liquids of any kind in containers of any description, whether the same be above or below, proximate, or removed from the gage.

In the accompanying drawing, forming part of this specification, wherein I have shown my improved apparatus applied to a tank containing water, A designates the gage, which consists, essentially, of two tubes B C, held together by suitable supports D E, and communicating with each other by means of a passage F in the lower support E. From the tube B runs a pipe G, which is connected at its end with an air-chamber H, passing entirely through and projecting above the tank I containing the water to be measured. Where it is impossible or undesirable to place the air-chamber H within the receptacle containing the liquid to be measured the same may be placed outside of it and connected therewith by suitable pipe or pipes, which will allow the liquid to enter the air-chamber at the same time it enters the container I.

I have shown the apparatus combined with a gage having two legs; but I do not confine myself to that particular construction, as the apparatus will work equally well when applied to gages of different construction.

At a suitable place in the pipe G is placed an inlet-cock c, through which a gas not soluble in or absorbable by the liquid to be measured may be admitted as a substitute for air which occupies the air-chamber H and pipe G connected therewith. The substitution of a gas of the foregoing description in place of air becomes necessary where the liquid to be measured is of such a character that it will dissolve or absorb the atmospheric gases contained in the air-chamber H and pipe G, and which, if permitted, would reduce the volume of air in said air-chamber and pipe, and thereby cause the gage to register inaccurately.

At the upper portion of the gage and connecting with the tube C is a chamber J, from which is led a pipe K, which terminates in the upper part of the tank or container I; this pipe K being necessary in all cases where the liquid to be measured is under pressure, and by means of this pipe the pressure which bears upon the liquid in the container is communicated to the chamber J and thence to the tube C, thereby equalizing the pressure in the gage. In all other cases where the liquid to be measured is not under pressure this pipe may be entirely dispensed with and an ordinary air-vent substituted in its stead.

The size of the air-chamber H will in all cases depend upon the distance at which the gage is situated from the container—viz., increase in diameter as the length of the pipe G increases, and vice versa. The said air-chamber also bears a relative proportion to the registering-glass in the gage.

The operation of my improved apparatus is as follows: Before any liquid is permitted to enter the container I the fluid in the tubes B C of the gage will be at a level indicated by the dotted line. The moment water is fed into the container I the open lower part of the air-chamber H becomes sealed and prevents the air within said chamber from escaping. As the water gradually rises in the container I it likewise rises in the air-chamber H, thereby compressing the air contained therein. This air-chamber being connected by the pipe G with the tube B of the gage causes the fluid within said tube B to be depressed and the fluid in the tube C to rise. The tube C being divided in relative proportion to the height of the container I will therefore register the exact quantity of water in the container. When the water is withdrawn from the container, the compression in the air-chamber becomes diminished and allows the fluid to rise again in the tube B and fall correspondingly in the tube C of the gage. This continues until the container is entirely emptied and the open end of the air-chamber H becomes unsealed. The fluid will then be again level in both legs of the gage.

When the liquid to be measured in the container is under pressure, the pipe K, leading from the upper part of the container, communicates the pressure bearing upon the liquid to the gage and equalizes the pressure upon the fluid in said gage, and the gage will then operate as above described.

Having thus described my invention, what I claim, and desire to secure by Letters Patent, is—

In an apparatus for measuring liquids under pressure, the combination of a gage of suitable construction, a receptacle to receive the liquid to be measured, an independent air-chamber adapted to be sealed by and permit the ascent therein of said liquid, and a pipe connecting said independent air-chamber with one leg of the gage, with a pipe for equalizing the pressure upon the fluid within the gage leading from the receptacle to the other leg of said gage, substantially as herein shown and described.

Signed at the city of New York, in the county and State of New York, this 28th day of September, 1893.

FREDERICK J. MITCHELL.

Witnesses:
HENRY BAER,
GUSTAVE DIETERICH.